(12) United States Patent
Planells Almerich

(10) Patent No.: US 6,940,257 B2
(45) Date of Patent: Sep. 6, 2005

(54) BATTERY CHARGER

(76) Inventor: Francisco Planells Almerich, San Valeriano 7, P.O. 148, Torrente (ES), E-46900

( * ) Notice: Subject to any disclaimer, the term of this patent is extended or adjusted under 35 U.S.C. 154(b) by 147 days.

(21) Appl. No.: 10/473,577
(22) PCT Filed: Mar. 27, 2002
(86) PCT No.: PCT/ES02/00157
§ 371 (c)(1), (2), (4) Date: Sep. 26, 2003
(87) PCT Pub. No.: WO02/080333
PCT Pub. Date: Oct. 10, 2002

(65) Prior Publication Data
US 2004/0090208 A1 May 13, 2004

(30) Foreign Application Priority Data
Mar. 30, 2001 (ES) .......................................... 200100797

(51) Int. Cl.[7] ............................................. H01M 10/46
(52) U.S. Cl. ...................................................... 320/137
(58) Field of Search ................................. 320/124, 125, 320/134, 136, 137

(56) References Cited

U.S. PATENT DOCUMENTS 4,079,303 A * 3/1978 Cox ............................ 320/119
5,637,983 A * 6/1997 Planells Almerich et al. .... 320/162
6,737,832 B2 * 5/2004 Uchida ........................ 320/138

FOREIGN PATENT DOCUMENTS

| FR | 2449353 | 9/1980 |
| GB | 2142487 | 1/1985 |
| WO | WO 95/19061 | 7/1995 |

* cited by examiner

Primary Examiner—Edward H. Tso
(74) Attorney, Agent, or Firm—Richard M. Goldberg

(57) ABSTRACT

The invention relates to a battery charger comprising a primary circuit: a secondary circuit consisting of at least one transformer secondary and a rectifier; and an overload prevention circuit. According to the invention, the primary circuit is provided with at least one general switch (5), a switch (6b) that is actuated by a relay (6a) in accordance with determined load conditions and a transformer primary, all of which are disposed in series. The overload prevention circuit comprises a voltage-sensitive switch and at least one reactance (7, 7a, 7b, 7c, 7d) is disposed in the primary circuit or between the transformer and the rectifier in the secondary circuit. The invention is suitable for producing battery chargers.

7 Claims, 1 Drawing Sheet

BATTERY CHARGER

BACKGROUND OF THE INVENTION

This invention refers to a battery charger whose design allows great charging efficiency and an astounding charging speed to be obtained.

Specifically, the charger designed in this invention is meant for charging family vehicles, industrial vehicles or industrial machinery.

There are already well-known chargers which have an input for power supply from the mains, a transformer to transform the current voltage to the right voltage, a rectifier to convert the alternating input current into full-wave direct current and an overcharge prevention circuit, so that when the battery gradually gets up to the charging voltage, the circuit for preventing overcharges allows current through.

Though this type of charger is reliable, they do on the other hand involve some adverse effects, that is, as the overcharge prevention circuit is activated, there is unnecessary power consumption (the current consumed going through said overcharge prevention circuit) and also as said circuit is activated, the charging current is lower, as it is shared with said circuit. The greater the battery charge, the lower the amount of current that goes through the charging circuit and the higher the amount through the overcharge prevention circuit.

SUMMARY OF THE INVENTION

This invention covers a charger for batteries which makes use of all the voltage as a charging voltage, so that control of overcharging is performed by means of a voltage control on charging terminals.

Batteries have been seen to offer greater resistance to charge the more discharged they are, due to the ionisation state of the products contained inside them. On the other hand, it has also been seen that although the battery offers a voltage opposed to the charging voltage, the "charging pressure" supplied by a charger connected to the mains or to a high power generator gives a voltage between terminals more dependent on said resistance than that of the opposition voltage.

This voltage does not act wholly against the charging voltage, so that the greater the state of charge of the battery the lower the resistance offered to said charge, and thus the greater the circulation of current through said battery, and consequently the greater the voltage between terminals.

It is consequently possible to find out the battery's charge status from the voltage found on the charge clips. Nevertheless, the antecedents existing have a device for preventing overcharging which absorbs a large amount of current, the greater the more fully-charged the battery is, so that while maintaining the consumption of the circuit, the charging circuit strictly speaking receives an amount of current tending to zero.

Another effect found with batteries is the stabilisation of the voltage after the charge has been deactivated, there being a certain drop in respect of the voltage as soon as said charging is completed. This drop is practically constant for a certain type of batteries, and is somewhere between 1V and 3V on a 12V battery, and approximately proportionate in batteries with greater voltage (always depending on the specifications of the battery in question). Therefore to get full charge, it is advisable for the battery to be charged at a voltage slightly over the nominal one, so that after stabilisation the voltage will actually be the nominal level.

It is also desirable for the charging terminals not to have any voltage whatsoever until reaching the charging position, even when the charging order has been given by activating the circuit.

It is also desirable for a charger to allow more than one type of battery (a particular voltage) and different powers to be charged. It is furthermore desirable to know the status of the charging operation, that is, which parts are active.

BRIEF DESCRIPTION OF THE DRAWINGS

In order to illustrate the explanation that is to follow, we enclose with this descriptive report a sheet of drawings that represents the essence of this invention in two figures, and in which.

DETAILED DESCRIPTION

Figure 1:
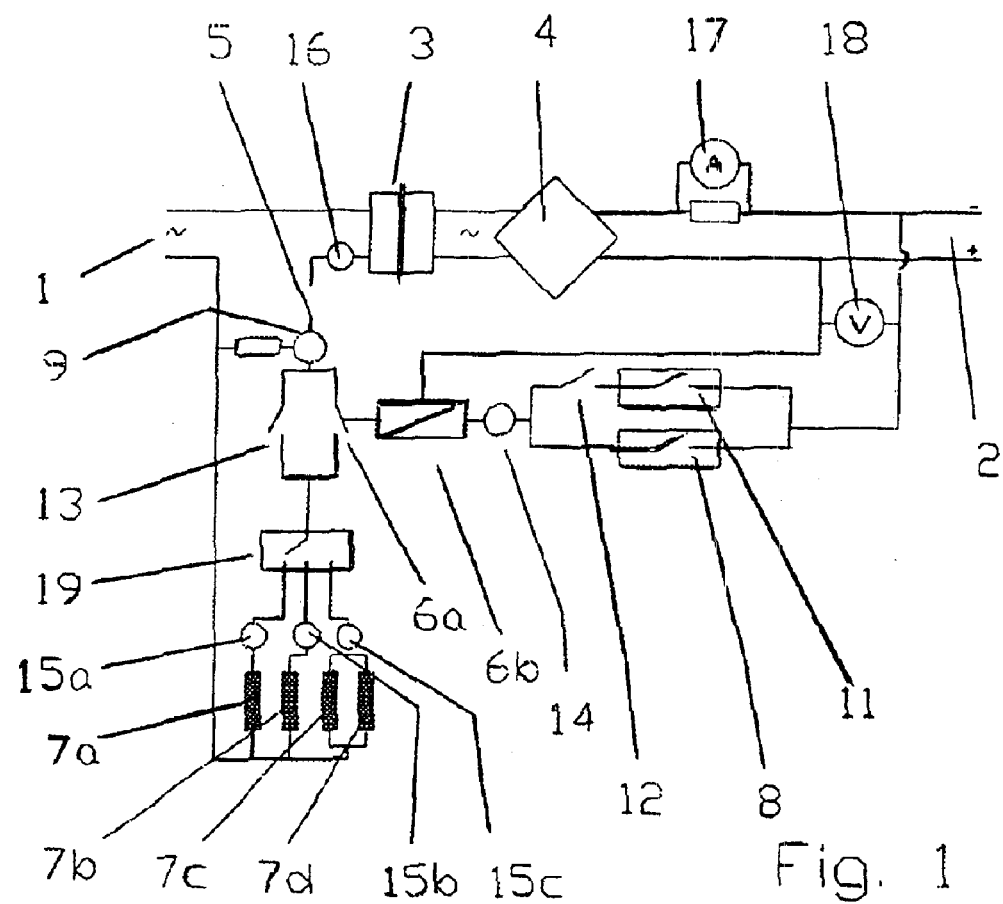
FIG. 1 shows the circuit of a charger in accordance with the invention, as in a first embodiment.

As seen in the embodiment shown in FIG. 1, 1 shows the connection terminals to the mains in alternating current, and 2 the charge terminals, where 3 is a transformer of suitable power, 4 a rectifier, such as a diode rectifier bridge and 5 a main power switch.

The charger basically has two circuits, a primary one or input circuit in alternating current and a secondary one, in which there is also alternating current at the output of the transformer, but this is immediately rectified by means of a rectifier, this rectified current or charge current acting in series with the battery. As an overcharge prevention circuit there is a voltage-sensitive switch, so that when the voltage reaches a certain value, the circuit is deactivated.

Figure 2:
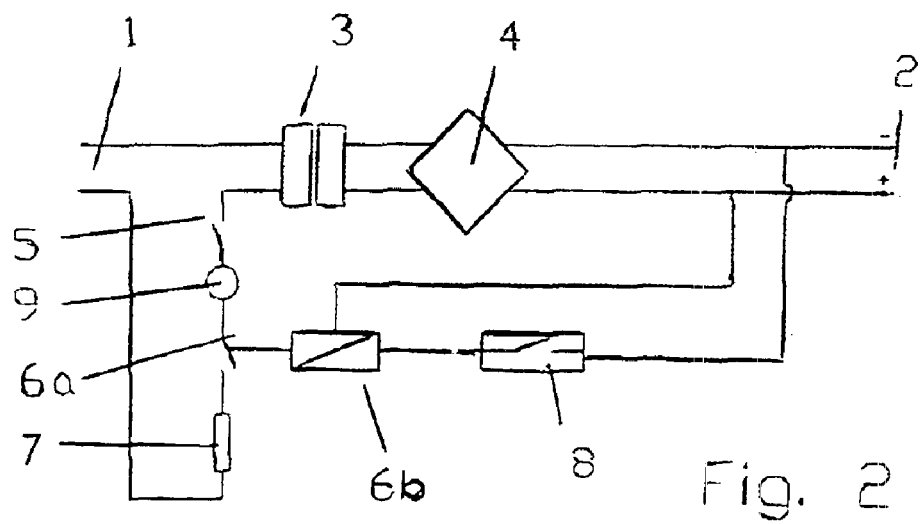
FIG. 2 shows a simplified circuit in accordance with a second embodiment.

In accordance with the embodiment in FIG. 2, the primary circuit includes an alternating current input 1, a reactance 7 of a certain power, a switch 5 and an input phase in a transformer 3. The reactance 7 could nevertheless be in the alternating current part of the secondary circuit, that is, between the transformer and the rectifier.

The secondary circuit includes an output of the transformer 3, a rectifier 4 from which alternating current comes out, and charging terminals 2.

The rectifier (which has not been considered as needing to be represented in detail through involving a well-known technique) is preferentially formed (as is customary) by a set of diodes which allow and force the positive current through only one of the branches, while they allow and force the negative current through the other.

As an overcharge prevention circuit there is a voltage-sensitive switch 8 so that through the envisaged effect, when the voltage reaches a certain value, the switch closes, acting against a relay 6a, which acts against a switch 6b which opens the circuit, totally interrupting the charge and preventing any unnecessary consumption.

The circuit shown in FIG. 1 essentially includes the same diagram as FIG. 2, but in the latter there are further items.

The primary circuit according to said embodiment includes a series layout comprising a main switch 5 and a corresponding LED 16 which comes on when said switch closes the circuit, a fuse 9, reactances 7a, 7b, 7c, 7d, with their corresponding operating LEDs 15a, 15b, 15c, which will operate alternately and a selector switch 19 which will determine which of the input lines will be active in respect of the output line which closes the circuit.

Said primary circuit also has a switch 6b activated by a corresponding relay 6a, which will be closed when there are charging conditions and will open when these conditions are no longer present.

The secondary circuit according to this embodiment consists of a circuit in which the secondary coil of transformer 3, a rectifier 4 and the charge terminals 2 are set in series.

To give the use more information about the charging status and conditions an ammeter 17, (set in series on one of the output branches) and a voltmeter 18 (located in parallel between both output branches) have been included.

As an overcharging-preventing circuit, as in the embodiment shown in FIG. 2, there is also a switch 8 sensitive to voltage so that, through the effect foreseen, the switch closes when the voltage reaches a certain value, acting against a relay 6a, which acts on a switch 6b that opens the circuit, totally interrupting the charge and avoiding any unnecessary consumption.

As we shall see, a second voltage-sensitive switch 11 has been set in parallel with said overcharge prevention circuit, and said switch can be connected or disconnected by means of the manual switch 12 series connected to this. Said second switch 11 sensitive to voltage has the purpose of activating the start of the charging process when the battery located in a fixed machine (permanently connected to the charger) drops to a charge level lower than what is determined by said switch 11. In the event of said switch 11 being activated, a LED 14 to indicate this can be fitted.

For the switch 6b to be able to be activated by the relay 6a, the contact 8 switch must be getting current from the battery, so that no current goes through unless the battery is connected. Nevertheless, when totally discharged batteries are connected, said contact switch 8 cannot be activated by means of the voltage from the battery, meaning that manual activation (or bridging) of the contract relay 6b has to be made for the circuit to be activated.

For this purpose the switch 13, normally with a pushbutton or timer, has been included, to allow current through the switch 6b even when the switches sensitive to voltage 8 and 11 are closed.

The charger being described means that not only can the charging be optimised through being done in series with the battery on charge, but this can be improved in time and quantity, due to the fact that this circuit allows charging with a voltage of roughly double the nominal battery voltage without there being any deterioration nor significant heating up.

The LEDS, insofar as they do not have an influence on the charging status, but only on the display for giving information to the user, are defined in a totally optional way.

Furthermore two or more components can be grouped in a printed or integrated circuit without this entailing any variation in the resources nor forfeiting the purposes described herein.

The invention is for industrial application in manufacturing battery chargers.

What is claimed is:

1. A battery charger comprising:
   (A) a primary circuit including a series connection of:
      (1) a primary coil of a transformer,
      (2) a main power switch,
      (3) a relay, and
      (4) a primary coil switch activated by said relay in accordance with specific charge conditions,
   (B) a secondary circuit including:
      (1) a secondary transformer coil of the transformer,
      (2) a rectifier connected with the secondary transformer coil, and
      (3) an overcharge prevention circuit including:
         (i) a voltage sensitive switch connected to said primary coil switch, and
         (ii) an activating circuit for activating a start of a loading process for fully discharged batteries, said activating circuit including a contact switch in parallel with said relay and which one of:
            (a) activates said relay, and
            (b) temporarily takes said relay out of service,
   (C) at least one reactance which defines a current intensity of the primary circuit, the at least one reactance being connected one of:
      (1) in the primary circuit, and
      (2) between the transformer and the rectifier in the secondary circuit, and
   (D) charge terminals connected with the primary and secondary circuits.

2. A battery charger in accordance with claim 1,
   wherein there are a plurality of reactances, and
   further comprising a selector switch for selecting at least one of said reactances so that when the primary circuit is closed through at least one said reactance, remaining ones of said reactances are deactivated, with a consequent reactance being determined by an intensity of current which travels through the primary coil of the transformer, and consequently, a battery charge current.

3. A battery charger in accordance with claim 1, wherein the the voltage sensitive switch of the overcharge prevention circuit is open or closed in dependence upon a voltage existing at the charge terminals so that when a specific pre-set voltage is reached, the voltage sensitive switch is disconnected which acts on the relay which disconnects the primary coil switch.

4. A battery charger in accordance with claim 1, further comprising an automatic recharging circuit for static batteries when a charge on the static batteries drops below a pre-set value, said automatic recharging circuit including a second voltage sensitive switch which connects or disconnects depending on a voltage existing between the charge terminals such that when the voltage drops below a pre-set value, the second voltage sensitive switch closes and sets the relay which connects the primary coil switch.

5. A battery charger in accordance with claim 1, wherein the contact switch of the activating circuit is disconnected in a pre-set time, when the battery has obtained a state with sufficient charge to activate the voltage sensitive switch.

6. A battery charger in accordance with claim 2, further comprising an automatic recharging circuit for static batteries when a charge on the static batteries drops below a pre-set value, said automatic recharging circuit including a second voltage sensitive switch which connects or disconnects depending on a voltage existing between the charge terminals such that when the voltage drops below a pre-set value, the second voltage sensitive switch closes and sets the relay which connects the primary coil switch.

7. A battery charger in accordance with claim 3, further comprising an automatic recharging circuit for static batteries when a charge on the static batteries drops below a pre-set value, said automatic recharging circuit including a second voltage sensitive switch which connects or disconnects depending on a voltage existing between the charge terminals such that when the voltage drops below a pre-set value, the second voltage sensitive switch closes and sets the relay which connects the primary coil switch.

\* \* \* \* \*